United States Patent [19]

Gerson et al.

[11] 4,072,548
[45] Feb. 7, 1978

[54] PANEL DOOR AND METHOD OF CONSTRUCTION

[76] Inventors: Howard S. Gerson; Bernard Gerson, both of 3802 N.W. 32 Ave., Miami, Fla. 33142

[21] Appl. No.: 754,559

[22] Filed: Dec. 27, 1976

[51] Int. Cl.² .............................................. B32B 5/20
[52] U.S. Cl. .................................... 156/79; 52/309.9;
  52/314; 144/309 N; 144/316; 156/92; 156/219;
  156/242; 428/314; 428/425; 264/46.4;
  264/46.7; 264/220
[58] Field of Search .................. 156/79, 242, 219, 92;
  52/309.8, 309.4, 309.11, 314; 428/314, 425;
  144/309 N, 314 R, 315 R, 316, 309 R; 264/321,
  46.4, 46.6, 46.7, 45.1, 219, 220, 225

[56] References Cited

U.S. PATENT DOCUMENTS

| 3,402,520 | 9/1968 | Lee et al. | 52/309.11 |
| 3,700,516 | 10/1972 | Sullivan | 156/79 |

*Primary Examiner*—Edward G. Whitby

[57] ABSTRACT

A panel door comprised of a rectangular wood frame defining a generally rectangular central opening which may be subdivided by one or two spaced apart transverse frame members to define two or three smaller central openings. A thin plywood panel is laminated to a front side of the door and routed out in the central open area or areas and a reinforced polyurethane sculptured panel is molded into each opening. A thin plywood panel is laminated to the back side of the door. Both the front and back plywood panels are prelaminated with a polyvinyl chloride film.

5 Claims, 12 Drawing Figures

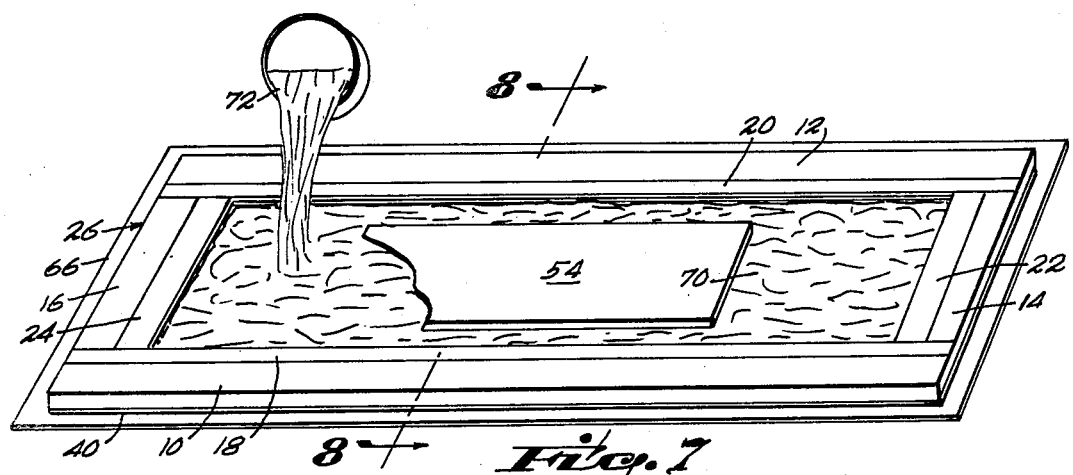
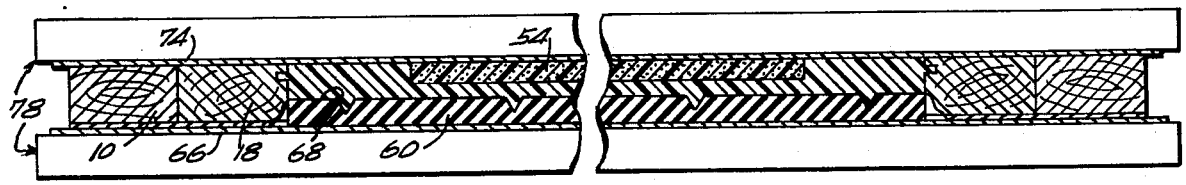
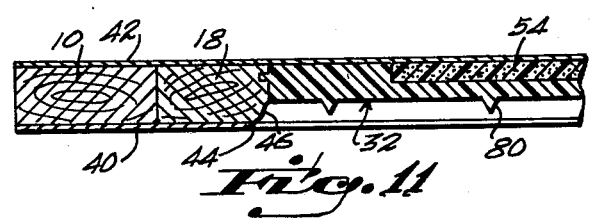
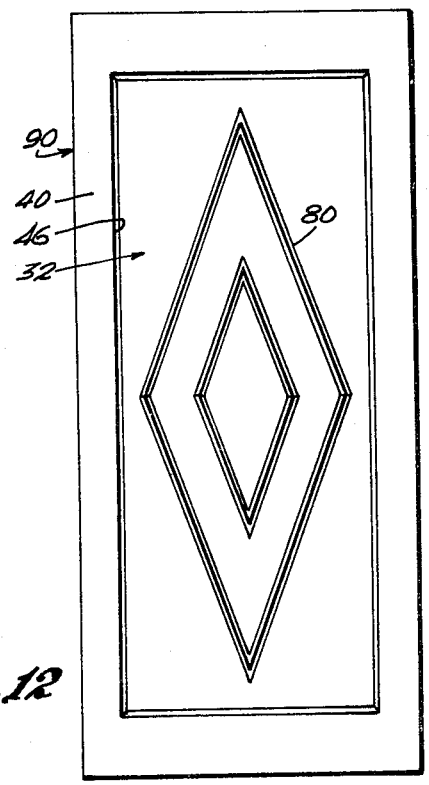

PANEL DOOR AND METHOD OF CONSTRUCTION

FIELD OF THE INVENTION

This invention pertains to a panel door and more particularly to a panel door provided with one or more sculptured polyurethane central panels.

BACKGROUND OF THE PRESENT INVENTION

Sculptured panel doors are generally constructed with carved wood panels which are susceptible to adverse weather conditions as well as being very costly. The panel door of the present invention is constructed of a solid wood frame with a reinforced molded panel, keyed to the wood frame. The panel, so formed, is solid, weatherproof and has the look, feel and warmth of the finest hand-carved hardwoods. In addition, the process used to produce the doors gives strength thereto and completely seals the door so water will not penetrate it. Styles and rails of the doors are coated with a polyvinyl chloride film to enhance their looks and to keep water from the door and to avoid rotting and splitting.

Therefore, one of the principal objects of the present invention is to provide a panel door construction utilizing a solid wood peripheral frame defining one or more central open areas for the reception of one or more molded panels formed directly therein.

Another principal object of the invention is to provide means to key the molded panels to the wood door frame.

A further object of the instant invention is to laminate the inside and outside surfaces of the wood styles and rails with a thin film of polyvinyl chloride.

A further object of the invention is to provide a method of constructing the door which is fast and efficient, and which results in a superior, strong, weatherproof panel door with the looks of panel doors employing hand carved panels at a substantially reduced price.

BRIEF DESCRIPTION OF THE DRAWINGS

FIG. 7 is a perspective view similar to FIG. 6 illustrating a sixth step in the door construction;

FIG. 8 is a cross sectional view taken along line 8—8 of FIG. 7, illustrating a seventh construction step;

FIG. 9 is a cross sectional view similar to FIG. 8, illustrating an eighth step in the door construction;

FIG. 10 is a fragmentary cross sectional view similar to FIG. 9, illustrating a ninth step in the door construction;

FIG. 11 is a fragmentary cross sectional view similar to FIG. 10, illustrating a tenth step in the door construction; and FIG. 12 is an elevational view of the outer side of the finished door with a sculptured panel.

DESCRIPTION OF A PREFERRED EMBODIMENT OF THE INVENTION

Figure 1:
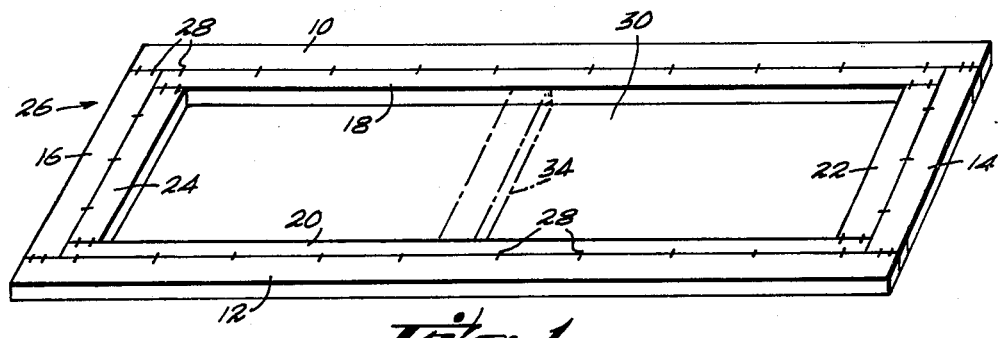
FIG. 1 is a perspective view of the first step, forming the wood frame, of the panel door of the present invention.

With reference to the drawings in which like reference characters designate like or corresponding parts throughout the various views and with particular reference to FIG. 1, the door includes an inner skeletal frame composed of outer opposed side rails 10 and 12, interconnected at their opposed ends by outer top and bottom rails 14 and 16. Inner opposed side rails and inner top and bottom rails 18, 20, 22 and 24 are provided adjacent the respective outer rails and the entire frame assembly 26 is secured together by staples 28. The frame assembly 26 provides a generally rectangular central opening 30 for the reception of a single large molded panel 32 as illustrated in FIG. 12. However, two or three panel doors, for example, may be constructed by the addition of one or two spaced apart transverse frame member, spanning opening 30, one being indicated at 34. Frame member or members 34 are similarly stapled in place.

With reference to FIGS. 11 and 12, the finished door is provided with relatively thin plywood sheets 40 and 42 laminated to the outside and inside faces of the wood frame 26. The outer faces of sheets 40 and 42 are prelaminated with thin films of polyvinyl chloride (not shown). The outside sheet of plywood 40 is cut out as at 44 in general conformity with the frame opening 30, the front peripheral edge of opening 30 along with the central portion of outside plywood sheet 40 being simultaneously routed out with a cutter to simulate peripheral molding strips as at 46.

Central sculptured panel 32 is molded of polyurethane and is keyed relative to opening 30 by a peripheral slot 50 in the inside faces 52 of inner rails 18, 20, 22 and 24. A reinforcing insulation panel 54 is embedded in the sculptured panel 32. If the central frame opening 30 is divided into two or three small openings as above described, like or different design panels are molded into the respective openings. A virtual limitless variety of single, or mixed or matching embossed panel designs may be provided for single or multiple panel doors of the present invention.

Method of Constructing the Door of the Present Invention

Figure 6:
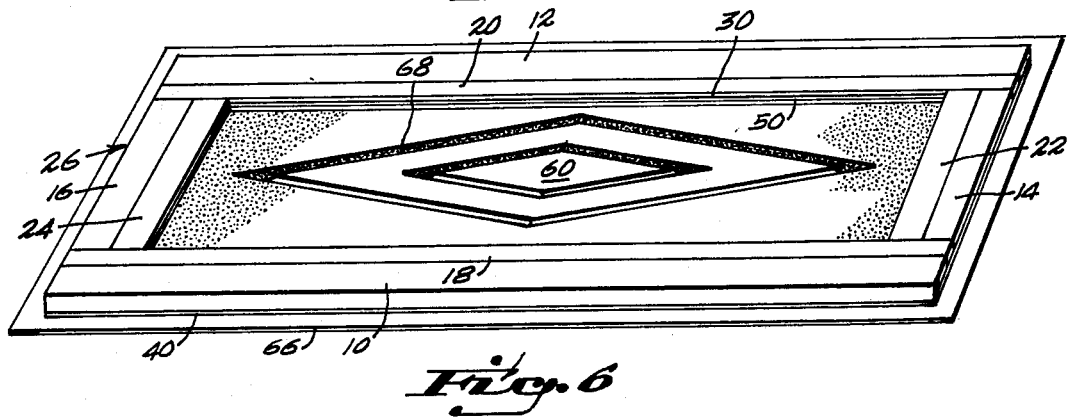
FIG. 6 is a perspective view similar to FIGS. 1, 2 and 4, illustrating a fifth step in the door construction.

FIG. 1 illustrates the first construction step as previously described, however, before the various frame members are stapled together as at 28, a mold 60 as seen in FIGS. 6, 8 and 9, preferably formed of silicone rubber, is inserted into the opening 30 to insure a perfect sizing of frame 26 relative to said mold. The frame members 10, 12, 14 and 16, and 18, 20, 22 and 24 are then stapled as at 28 and the mold 60 is then removed.

Figure 2:
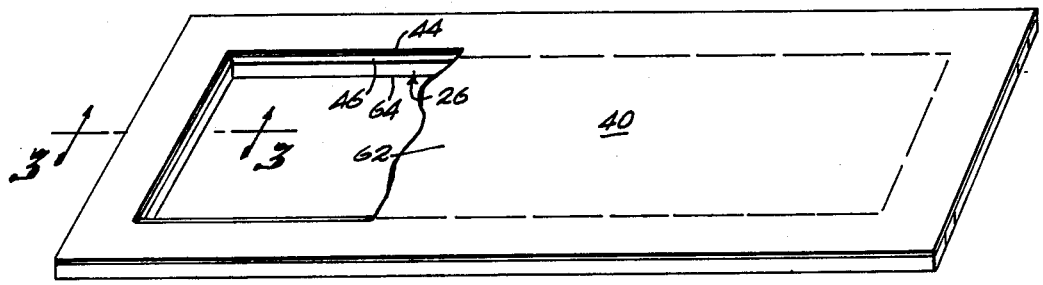
FIG. 2 is a perspective view similar to FIG. 1 illustrating second and third steps in the door construction.
Figure 3:
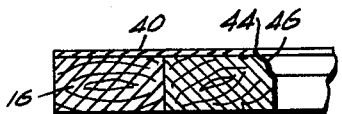
FIG. 3 is a cross sectional view taken along line 3—3 of FIG. 2.

In the second construction step, illustrated in FIG. 2, the relatively thin sheet of plywood 40, precoated on the outside with a thin film of polyvinyl chloride, is laminated to the outside face of the door frame 26. The third step comprises, simultaneously routing out the central portion 62 of plywood sheet 40 and the front peripheral edge portion of opening 30 to define the simulated molding strip 46.

Figure 5:
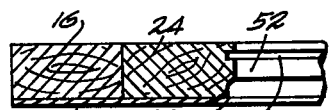
FIG. 5 is a cross sectional view taken along line 5—5 of FIG. 4.
Figure 4:
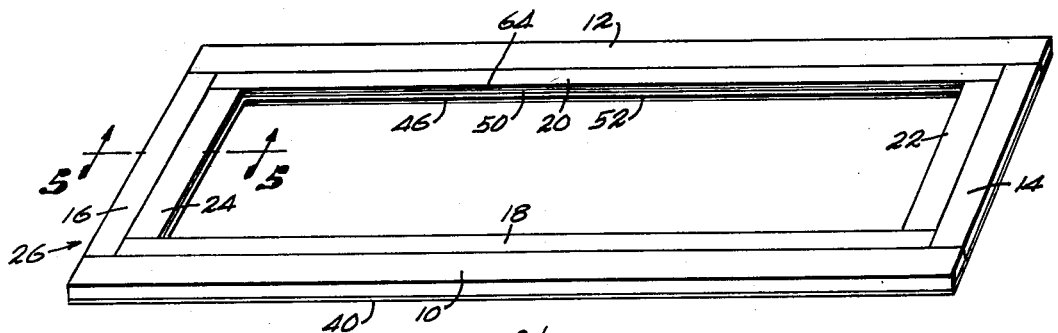
FIG. 4 is a perspective view similar to FIGS. 1 and 2, illustrating a fourth step in the door construction.

FIGS. 4 and 5 illustrate the fourth step in which the door is turned over and the key groove 50 is routed in the inside face 52 of inner rails 18, 20, 22 and 24 adjacent the inside face of frame 26. In fact, the groove 50 may be formed about the periphery of inside edge 64.

In the fifth construction step, the frame 26 is turned over to place the outside face on a large sheet of plywood 66 and the mold 60 is placed on plywood sheet 66 in the frame opening 30 with the design side 68 up. The design side is sprayed with a release agent and liquid polyurethane 70 is then distributed as by pouring 72 about the design side 68 and the reinforcing insulation panel 54 is placed generally centrally of the opening 30 on top of the liquid polyurethane 70.

As seen in FIG. 8, in the sixth construction step, a relatively heavy sheet 74 of polyvinyl chloride is placed over the inside face of the frame in a closing relation to opening 30. The seventh construction step, FIG. 9, consists of putting the door into a press 78 under pressure and sandwiched between sheets 66 and 74 for a period of time, approximately 30 minutes until the polyurethane expands and hardens as in FIG. 9 to form panel 32.

The door and sheets 66 and 74 are removed from the press 78 in the eighth step, FIG. 10, and the sheets 66 and 74 along with the rubber mold 60 are then removed from the door exposing the molded design 80 in panel 32. In the ninth construction step, FIG. 11, the thin plywood panel 42 with a matching polyvinyl film is applied in a covering relation to the inside surface of the frame 26, polyurethane panel 32 and the reinforcing insulation panel 54.

In the final step, the door 90 is trimmed to a standard door size and the embossed polyurethane panel 32 is glazed to match the polyvinyl film on the styles and rails.

What is claimed is:

1. Method of constructing a panel door comprising the steps of:
   a. Constructing a rectangular skeletal frame having outside and inside faces and defining at least one rectangular opening in a central portion thereof, providing a rectangular mold having a design side and sizing said rectangular opening to said mold prior to assembling said skeletal frame as by staples,
   b. laminating a sheet of plywood in a covering relation to said outside face,
   c. simultaneously routing out a central portion of said plywood sheet and a peripheral edge portion of said rectangular opening to form a simulated molding strip around said rectangular opening,
   d. routing out a key groove in said skeletal frame within and around said rectangular opening,
   e. placing said mold in said rectangular opening with said outside face in a down position and said mold design side in an up position and distributing foamable liquid polyurethane over said design side after spraying said design side with a release agent,
   f. placing a sheet of polyvinyl chloride over said inside face,
   g. placing the door in a press under pressure, sandwiched between said polyvinyl chloride sheet and a protective sheet of material on said outside face for a predetermined period of time until said polyurethane expands and hardens,
   h. remove said door from said press and said sheets and mold from said door,
   i. laminate a sheet of polyvinyl chloride over said inside surface.

2. The method as defined in claim 1 including the step of placing a reinforcing insulation panel in said rectangular opening atop said liquid polyurethane prior to placing said polyvinyl chloride sheet over said inside face.

3. The method as defined in claim 1 wherein the outside surfaces of said inside and outside plywood sheets are prelaminated with a thin film of polyvinyl chloride.

4. The method as defined in claim 2 wherein at least one transverse frame member is fixed in said skeletal frame to divide said rectangular opening into at least two smaller rectangular openings.

5. The method as defined in claim 4 including one of said molds for each rectangular opening.

* * * * *